United States Patent [19]
Garcia

[11] Patent Number: 6,019,624
[45] Date of Patent: Feb. 1, 2000

[54] VEHICULAR ADAPTER INSERTION MECHANISM

[75] Inventor: Jorge L. Garcia, Plantation, Fla.

[73] Assignee: Motorola, Inc., Schaumburg, Ill.

[21] Appl. No.: 09/124,665

[22] Filed: Jul. 29, 1998

[51] Int. Cl.$^7$ .................................................. H01R 13/15
[52] U.S. Cl. ............................................................ 439/259
[58] Field of Search ................................. 439/259, 260, 439/261, 266, 310, 338, 341; 348/233, 232; 361/684, 679; 385/59; 340/311.1; 248/27.1

[56] References Cited

U.S. PATENT DOCUMENTS 5,781,232   7/1998   Ejima ........................................ 348/233

*Primary Examiner*—Paula Bradley
*Assistant Examiner*—Alexander Gilman
*Attorney, Agent, or Firm*—Barbara R. Doutre

[57] ABSTRACT

A vehicular adapter (100) provides one step insertion for a radio (134). The adapter (100) includes an insertion mechanism including a stationary base (102), a slideable pocket (104), a connector arm (106) pivotally coupled (108) to the slideable pocket, and a link (110) pivotally coupled (112, 114) between the connector arm and the base. The pocket (104) and connector arm (106) slide within the base (102) when the radio (134) is inserted within the pocket causing the link (110) to pivotally engage the connector arm (106) against the radio.

9 Claims, 3 Drawing Sheets

US 6,019,624

VEHICULAR ADAPTER INSERTION MECHANISM

TECHNICAL FIELD

This invention relates in general to vehicular adapters for portable radios and more particularly to insertion mechanisms used in such adapters.

BACKGROUND

Portable radios are often used in conjunction with vehicular adapters in order to facilitate hands free communications as well as provide charging capability within an automotive environment. Police officers and emergency rescue personnel often utilize vehicular adapters in order to remotely access their radios while driving. Many of today's existing vehicular adapters require a two step insertion in order to engage the radio. Typically, the radio is first inserted into the adapter, and then a cam must be turned so that the radio's accessory connector makes contact with the contacts of the adapter. Users have indicated that it would be highly desirable to minimize the amount of effort required to insert and latch a radio into a vehicular adapter. While there have been some vehicular adapters in the past that have provided a one step insertion mechanism, these prior art mechanisms have tended to be high maintenance items that require servicing on a regular basis in order to prevent the radio from jamming in the adapter. Many of these prior art models have also been complicated to assemble thereby increasing manufacturing costs.

Accordingly, there is a need for an improved vehicular adapter insertion mechanism which provides one step insertion of the radio by the user. Ease of assembly would provide the further benefits of reduced cost.

DETAILED DESCRIPTION OF THE PREFERRED EMBODIMENT

Figure 1:
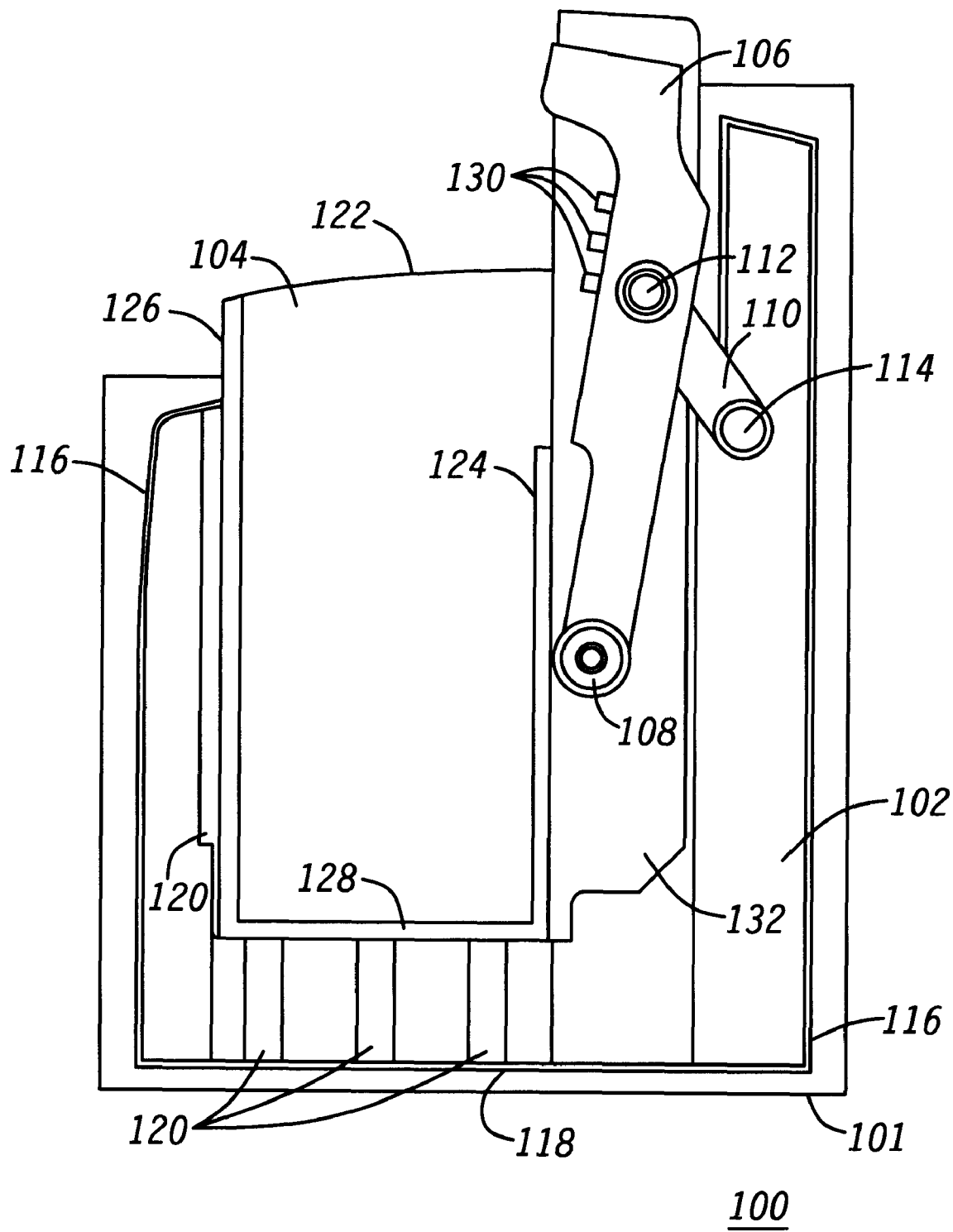
FIG. 1 is a vehicular adapter in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring to FIG. 1, there is shown a vehicular adapter 100 in accordance with the present invention. FIG. 1 shows a top view of the vehicular adapter 100 with exterior housing 101 partially removed. The vehicular adapter 100 of the present invention includes a stationary base 102 within which a slideable pocket 104 is coupled. In accordance with the invention, a connector arm 106 is pivotally coupled to the slideable pocket 104 at pivot point 108, and a link 110 is pivotally coupled to the connector arm 106 at pivot point 112 as well as to the stationary base 102 at pivot point 114. The stationary base 102 includes sidewalls 116 and a back wall 118 formed therein and within which the slideable pocket 104 moves. The slideable pocket 104 is aligned within the sidewalls 116 of the stationary base 102, preferably by rails 120. The slideable pocket 104 is formed of an opening 122 leading into and first and second sidewalls 124, 126 respectively as well as an end wall 128 for receiving a portable radio (shown later). The connector arm 106 preferably includes electrical contacts 130 for mating with corresponding radio contacts.

The slideable pocket 104 preferably includes an extension extending perpendicularly from the first sidewall 124 to provide a platform section 132 upon which pivot point 108 is coupled. The slideable pocket 104 platform section 132 are preferably molded from a single piece of plastic while the stationary base 102 is formed of a casting. Thus, in accordance with the present invention, pivot point 108 couples the connector arm 106 to the slideable pocket 104, pivot point 112 couples the connector arm 106 to the link 110, and pivot point 114 couples the link to the stationary base 102. This pivotal interconnection of the present invention including slideable pocket 104, connector arm 106, and link 110 allows the connector arm to swing inwardly (towards a radio) while the pocket slides forward into the adapter 100 and also allows the connector arm to swing outwardly (away from the radio when the pocket is slid outwardly from the adapter.

Figure 2:
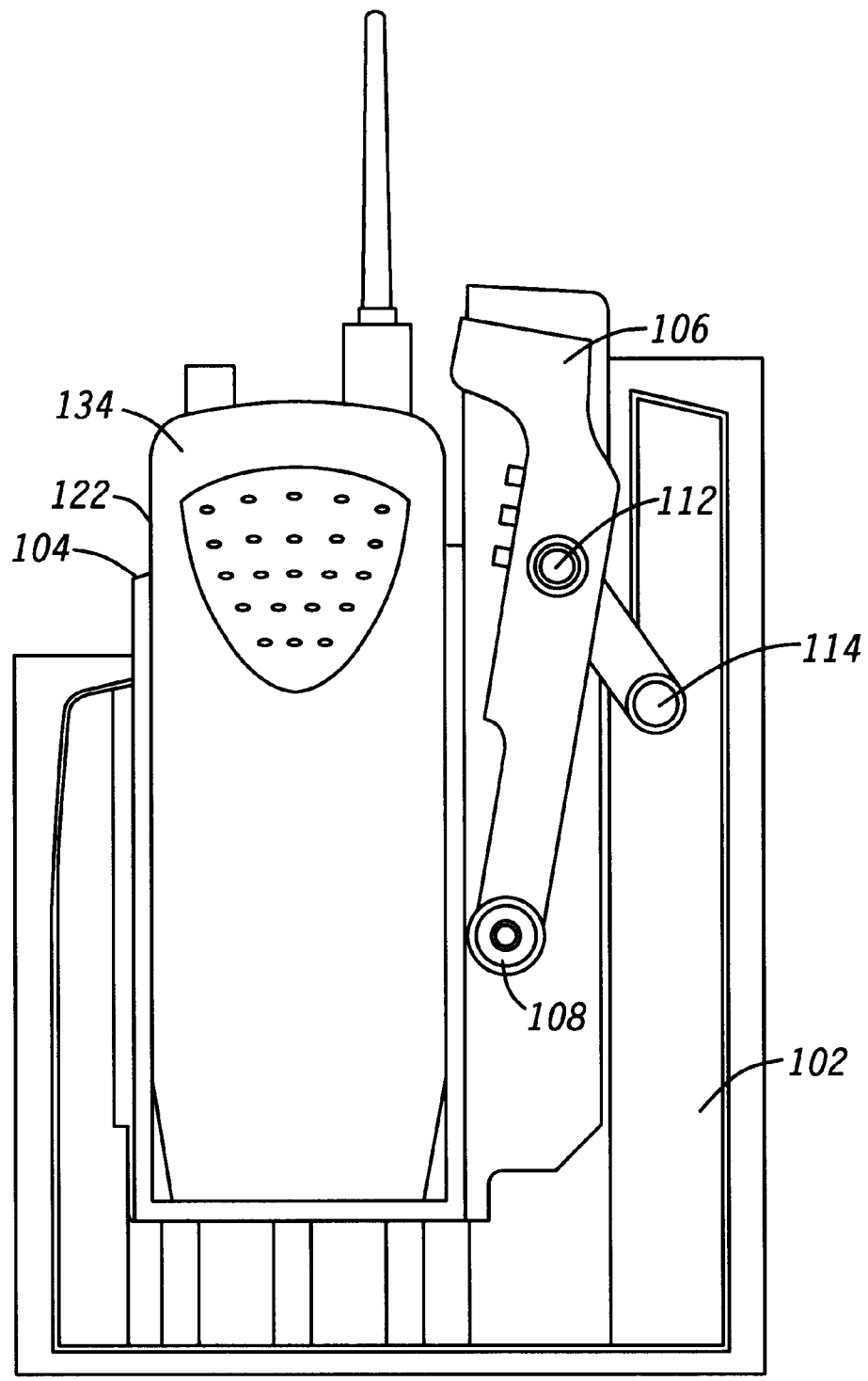
FIG. 2 is the vehicular adapter of FIG. 1 having a radio partially inserted in accordance with the present invention.

FIG. 2 is the vehicular adapter 100 of FIG. 1 having a radio 134 partially inserted therein in accordance with the present invention. In accordance with the invention, the pocket 104 and connector arm 106 coupled thereto slideably move within the stationary base 102 such that when the radio 134 is inserted within the pocket, the link 110 pivotally engages the connector arm 106 against the radio 134.

In more detail, as the radio 134 is pushed into the opening 122, the slideable pocket 104 moves the radio 134 inward. In accordance with the present invention, the slideable pocket 104 and connector arm 106 coupled thereto slideably move together within the stationary base 102. In accordance with the present invention, the movement of the slideable pocket 104 (and connector arm 106 pivotally coupled thereto) into the adapter 100 causes the link 110 to pivot between the two pivots points 112, 114. As the link 110 pivots between these two points (112, 114) it pushes the connector arm 106 thus forcing the connector arm 106 to pivot about pivot point 108 and move connector arm 106 towards the side of the radio 134.

Figure 3:
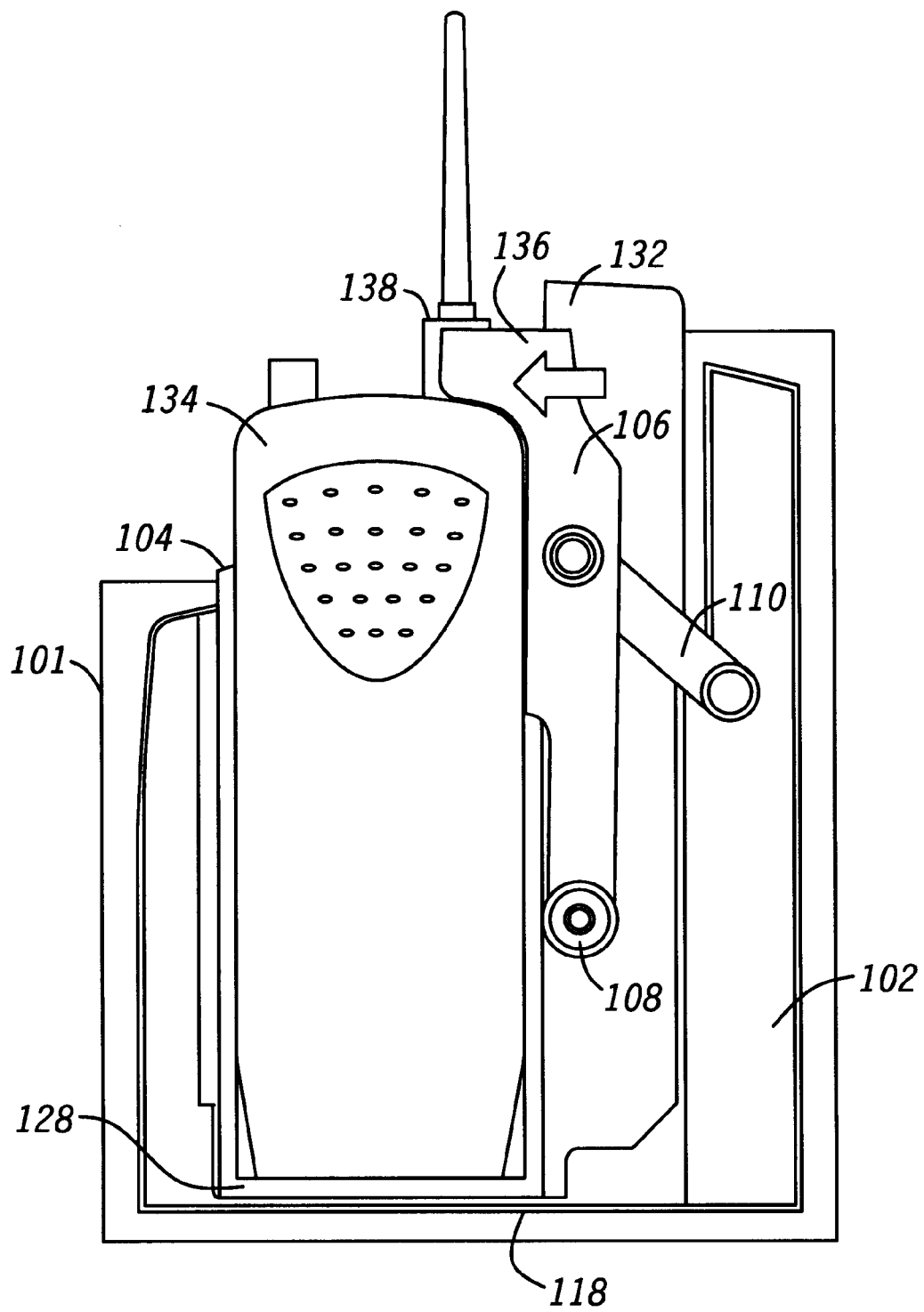
FIG. 3 is the vehicular adapter of FIG. 2 with the radio fully inserted in accordance with the present invention.

FIG. 3 is the vehicular adapter of FIG. 2 with the radio 134 fully inserted and the connector arm 106 fully latched in accordance with the present invention. In accordance with the present invention, the slideable pocket 104 is now fully inserted within the stationary base 102. At this point, the connector arm 106 is being retained against the radio 134 by the link 110. Captivation of the radio 134 is preferably further ensured by a captivation portion 136 of the connector arm 106. Captivation portion 136 preferably includes a cut out portion which fits around the base of a radio control knob or antenna 138 to provide additional captivation of the radio 134 within the adapter 100.

The vehicular adapter 100 of the present invention allows at least two ways for a user to insert the radio 134 into the adapter. The radio 134 can be inserted into the adapter 100 by sliding the radio into the slideable pocket 104 until the radio hits the end wall 128 of the pocket 104 and then pushing the radio until the end wall 128 of the pocket 104 hits the back wall 118 of the stationary base 102, which provides a quick one step insertion on the part of the user. Alternatively, the radio 134 can be slid into the slideable pocket 104 until the radio hits the end wall 128 of the pocket 104 and then pushing the platform section 132 of the slideable pocket 104 into the housing 101 in the same direction of the radio until the end wall 128 of the pocket 104 hits the back wall 118 of the stationary base 102. Either method of radio insertion causes the connector arm 106 to latch to the radio and provides a quick reliable insertion on the part of the user.

The vehicular adapter 100 described by the invention can include a variety of mechanisms for removal of the radio, such as a well known spring and latch mechanism.

Accordingly, there has been provided an insertion mechanism for a vehicular adapter which allows one step insertion of a radio. The combination of slideable pocket having a connector arm pivotally coupled thereto, along with the pivotal interconnection of the connector arm to the base provide an insertion mechanism which is easily assembled. Thus, the vehicular adapter described by the invention provides the benefits of one step insertion for the user as well as improved assembly for the manufacturer.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

I claim:

1. A vehicular adapter insertion mechanism for a portable radio having side contacts, comprising:
    a stationary base;
    a pocket slideably coupled to the stationary base, the pocket for receiving the portable radio;
    a connector arm pivotally coupled to the slideable pocket;
    a link pivotally coupled to the connector arm and the base; and
    the pocket and connector arm coupled thereto slideably move within the base such that when the radio is inserted within the pocket the link pivotally engages the connector arm against the side contacts of the radio.

2. A vehicular adapter as described in claim 1, wherein the base is a casting.

3. A vehicular adapter insertion mechanism for a portable radio, comprising:
    a stationary base having rails;
    a pocket slideably coupled to the rails of the stationary base, the pocket for receiving the portable radio;
    a connector arm pivotally coupled to the slideable pocket;
    a link pivotally coupled to the connector arm and the base; and
    the pocket and connector arm coupled thereto slideably move within the base such that when the radio is inserted within the pocket the link pivotally engages the connector arm against the radio.

4. A vehicular adapter for receiving a radio having side radio contacts, comprising:
    a housing, including:
        a stationary base having sidewalls and a back wall;
        a slideable pocket coupled within the sidewalls of the stationary base, the slideable pocket having an opening and first and second sidewalls and an end wall for receiving the portable radio and the slideable pocket for moving the portable radio into the housing;
        a connector arm pivotally coupled to the first sidewall of the slideable pocket, the connector arm including electrical contacts for mating with the side radio contacts;
        a link pivotally coupled between the side connector arm and the base;
        and wherein movement of the slideable pocket into the housing thereby causes the connector arm pivotally coupled thereto to engage against the radio and the link to retain the connector arm against the radio.

5. The vehicular adapter of claim 4, wherein the slideable pocket includes a platform section extending from the first sidewall, the connector arm being pivotally coupled to the platform section of the first sidewall of the slideable pocket.

6. A vehicular adapter for receiving a radio having radio contacts, comprising:
    a housing, including:
        a stationary base having sidewalls and a back wall;
        a slideable pocket coupled within the sidewalls of the stationary base, the slideable pocket having an opening and first and second sidewalls and an end wall for receiving the portable radio and the slideable pocket for moving the portable radio into the housing;
        a connector arm pivotally coupled to the first sidewall of the slideable pocket, the connector arm including electrical contacts for mating with the radio contacts;
        a link pivotally coupled between the side connector arm and the base;
        and wherein movement of the slideable pocket into the housing thereby causes the connector arm pivotally coupled thereto to engage against the radio and the link to retain the connector arm against the radio; and
    wherein the radio is inserted by sliding the radio into the slideable pocket until the radio hits the end wall of the pocket and then pushing the radio until the end wall of the pocket hits the back wall of the stationary base.

7. A vehicular adapter for receiving a radio having radio contacts, comprising:
    a housing, including:
        a stationary base having sidewalls and a back wall;
        a slideable pocket coupled within the sidewalls of the stationary base, the slideable pocket having an opening and first and second sidewalls and an end wall for receiving the portable radio and the slideable pocket for moving the portable radio into the housing;
        a connector arm pivotally coupled to the first sidewall of the slideable pocket, the connector arm including electrical contacts for mating with the radio contacts;
        a link pivotally coupled between the side connector arm and the base;
        and wherein movement of the slideable pocket into the housing thereby causes the connector arm pivotally coupled thereto to engage against the radio and the link to retain the connector arm against the radio; and
    wherein the radio is inserted into the housing by sliding the radio into the slideable pocket until the radio hits the end wall of the pocket and then pushing the platform section of the slideable pocket into the housing in the direction of the radio until the end wall of the pocket hits the back wall of the stationary base.

8. A vehicular adapter for receiving a portable radio having side contacts, comprising:
    a housing;
    a stationary base retained within the housing;
    a slideable pocket for sliding the radio into and out of the housing, the slideable pocket having a connector arm pivotally coupled thereto; and
    a link pivotally coupled to the connector arm and pivotally coupled to the stationary base, the link engaging the connector arm against the radio side contacts upon insertion of the radio into the slideable pocket.

9. The vehicular adapter of claim 8, wherein the connector arm includes a captivation portion for captivating an upper portion of the portable radio.

* * * * *